(12) United States Patent
Davison et al.

(10) Patent No.: US 8,821,271 B2
(45) Date of Patent: Sep. 2, 2014

(54) TECHNIQUES FOR PROVIDING NARRATIVE CONTENT FOR COMPETITIVE GAMING EVENTS

(75) Inventors: John Davison, San Rafael, CA (US); Boubou Guiro, Sausilito, CA (US)

(73) Assignee: CBS Interactive, Inc., New York, NY (US)

(*) Notice: Subject to any disclaimer, the term of this patent is extended or adjusted under 35 U.S.C. 154(b) by 0 days.

(21) Appl. No.: 13/561,692

(22) Filed: Jul. 30, 2012

(65) Prior Publication Data

US 2014/0031114 A1    Jan. 30, 2014

(51) Int. Cl.
A63F 9/24 (2006.01)
A63F 13/00 (2014.01)

(52) U.S. Cl.
USPC ........... 463/30; 463/1; 463/31; 463/43; 704/9

(58) Field of Classification Search
USPC ............................ 463/1, 29–33, 40–43; 704/9
See application file for complete search history.

(56) References Cited

U.S. PATENT DOCUMENTS

| | | | |
|---|---|---|---|
| 4,992,939 A * | 2/1991 | Tyler ................................. | 704/9 |
| 5,043,891 A | 8/1991 | Goldstein et al. | |
| 5,731,991 A | 3/1998 | Kinra et al. | |
| 5,802,495 A * | 9/1998 | Goltra ............................... | 705/3 |
| 5,913,215 A | 6/1999 | Rubinstein et al. | |
| 5,963,919 A | 10/1999 | Brinkley et al. | |
| 5,963,939 A | 10/1999 | McCann et al. | |
| 6,034,652 A | 3/2000 | Freiberger et al. | |
| 6,236,990 B1 | 5/2001 | Geller et al. | |
| 6,263,507 B1 | 7/2001 | Ahmad et al. | |
| 6,544,040 B1 * | 4/2003 | Brelis et al. .................... | 434/236 |
| 6,571,236 B1 | 5/2003 | Ruppelt | |
| 6,757,682 B1 | 6/2004 | Naimark et al. | |
| 6,788,314 B1 | 9/2004 | Freiberger et al. | |
| 6,976,031 B1 * | 12/2005 | Toupal et al. ......................... | 1/1 |
| 7,069,308 B2 | 6/2006 | Abrams | |
| 7,080,019 B1 | 7/2006 | Hurzeler | |
| 7,194,405 B2 | 3/2007 | Tavor | |
| 7,333,967 B1 * | 2/2008 | Bringsjord et al. ............. | 706/45 |
| 7,418,447 B2 | 8/2008 | Caldwell et al. | |
| 7,472,110 B2 | 12/2008 | Achlioptas | |
| 7,530,018 B2 | 5/2009 | Bischoff | |
| 7,720,723 B2 | 5/2010 | Dicker et al. | |
| 7,783,528 B2 | 8/2010 | Musgrove et al. | |
| 7,809,601 B2 | 10/2010 | Shaya et al. | |
| 7,840,448 B2 | 11/2010 | Musgrove et al. | |

(Continued)

OTHER PUBLICATIONS

Story Writer Code, 2005.

(Continued)

Primary Examiner — Milap Shah
(74) Attorney, Agent, or Firm — Kacvinsky Daisak Bluni PLLC

(57) ABSTRACT

Various embodiments for providing a narrative summary for content related to competitive gaming are described. An aspect may provide receiving data about a competitive gaming event, the data comprising one or more data items; selecting a narrative template for the competitive gaming event according to the data, the narrative template comprising one or more word slots and one or more data slots; filling a data slot in the narrative template with a data item; filling a word slot in the narrative template with a word selected from a word list configured for the word slot; and publishing the narrative template with the one or more word slots and the one or more data slots filled as competitive gaming narrative content. Other embodiments are described and claimed.

19 Claims, 12 Drawing Sheets

(56) References Cited

U.S. PATENT DOCUMENTS

| | | | |
|---|---|---|---|
| 7,856,390 B2* | 12/2010 | Schiller | 705/36 R |
| 8,019,656 B2 | 9/2011 | Baran et al. | |
| 8,355,903 B1* | 1/2013 | Birnbaum et al. | 704/9 |
| 8,374,848 B1* | 2/2013 | Birnbaum et al. | 704/9 |
| 8,515,737 B2* | 8/2013 | Allen | 704/9 |
| 8,630,844 B1* | 1/2014 | Nichols et al. | 704/9 |
| 2001/0032077 A1 | 10/2001 | Tavor | |
| 2002/0055379 A1* | 5/2002 | Saidakovsky et al. | 463/9 |
| 2002/0161664 A1 | 10/2002 | Shaya et al. | |
| 2002/0188556 A1 | 12/2002 | Colica et al. | |
| 2003/0105682 A1 | 6/2003 | Dicker et al. | |
| 2003/0135460 A1 | 7/2003 | Talegon | |
| 2003/0185368 A1 | 10/2003 | Bradfield et al. | |
| 2003/0212955 A1 | 11/2003 | Bischoff | |
| 2004/0015415 A1 | 1/2004 | Cofino et al. | |
| 2004/0024656 A1 | 2/2004 | Coleman | |
| 2004/0091848 A1* | 5/2004 | Nemitz | 434/365 |
| 2004/0148275 A1 | 7/2004 | Achlioptas | |
| 2004/0225651 A1 | 11/2004 | Musgrove et al. | |
| 2005/0075940 A1 | 4/2005 | DeAngelis | |
| 2005/0198031 A1 | 9/2005 | Pezaris et al. | |
| 2006/0101335 A1* | 5/2006 | Pisciottano | 715/531 |
| 2006/0135232 A1* | 6/2006 | Willis | 463/1 |
| 2006/0258419 A1* | 11/2006 | Winkler et al. | 463/1 |
| 2007/0132767 A1* | 6/2007 | Wright et al. | 345/475 |
| 2007/0198355 A1 | 8/2007 | Samson et al. | |
| 2008/0086512 A1 | 4/2008 | Fahys | |
| 2008/0306925 A1* | 12/2008 | Campbell et al. | 707/4 |
| 2009/0149248 A1* | 6/2009 | Busey et al. | 463/29 |
| 2009/0259697 A1 | 10/2009 | Satou et al. | |
| 2010/0203970 A1* | 8/2010 | Hope | 463/42 |
| 2010/0227685 A1* | 9/2010 | Mori | 463/30 |
| 2010/0268776 A1 | 10/2010 | Gerke | |
| 2011/0246182 A1* | 10/2011 | Allen | 704/9 |
| 2011/0258258 A1 | 10/2011 | Briere et al. | |
| 2011/0311205 A1 | 12/2011 | McClanahan et al. | |
| 2012/0010979 A1 | 1/2012 | Ramer et al. | |
| 2013/0173673 A1* | 7/2013 | Miller | 707/804 |
| 2013/0262092 A1* | 10/2013 | Wasick | 704/9 |

OTHER PUBLICATIONS

Explanatory Summary, 2005.
International Search Report, Application No. PCT/US2008/068916 mailed on Feb. 4, 2009.
EPO "Notice from the European Office dated Oct. 1, 2007 Concerning Business Methods", Official Journal of the European Patent Office, Nov. 1, 2007, pp. 592-593, vol. 30, No. 11.
Dale, et al., "Dynamic Document Delivery: Generating Natural Language Texts on Demand", 6 pages, dexa, pp. 131, 9th International Workshop on Database and Expert Systems Applications (DEXA '98), 1998.
International Search Report for PCT/US04/13595 dated Sep. 12, 2008.
Chai, Joyce, et al., "Natural Language Assistant: A Dialog System for Online Product Recommendation", AI Magazine, La Canada, Summer 2002, vol. 23, issue 2, p. 63.
Gardner, G. "Silicon Wadi", Jerusalem Post. Jerusalem: Feb. 14, 2002.
Scorbitz / Get on Board, http://getonboard.scorbitz.com, 9 webpages downloaded Aug. 23, 2012.

* cited by examiner

Story Type 400

Word Category
410

Word List
412

Word Definition
414

Paragraph Type
420

Paragraph Definition
422

Story Flavor
430

Paragraph Type Set
432

FIG. 4

TECHNIQUES FOR PROVIDING NARRATIVE CONTENT FOR COMPETITIVE GAMING EVENTS

CROSS-REFERENCE TO RELATED APPLICATIONS

This application is related to co-owned and co-pending U.S. patent application Ser. No. 13/338,409, titled "TECHNIQUES FOR PROVIDING A NATURAL LANGUAGE NARRATIVE" and filed on Dec. 28, 2011, and Ser. No. 13/338,395, titled "TECHNIQUES FOR PROVIDING A NARRATIVE SUMMARY FOR FANTASY GAMES" and filed on Dec. 28, 2011, both of which are incorporated by reference in their entirety.

BACKGROUND

Competitive gaming, commonly referred to as electronic sports or "eSports," involves the playing of video games in a competitive environment. Video game competitions have existed for nearly as long as video games themselves. Early competitions were set up as one-time tournament style matches between players focused on one particular game, often tied to new product releases. Eventually, competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), Global StarCraft® League, Collegiate Starleague, IGN Pro League, GameSpot®, and GotFrag provide opportunities for competition and to find information about competitive gaming. Until recently, participation in competitive gaming has demonstrated a gradual, steady pace of growth. However, competitive gaming is presently undergoing a rapid expansion in participation and interest. This growth is a result of many factors, including increased exposure, competition sponsorship, popular game releases, improved video streaming technologies, and advances in video game graphics and sophistication.

The expansion of competitive gaming has led to increased demand for information and content related to leagues, competitions, and top competitors. In addition, vast amounts of data are generated from competitive gaming events and related activities. However, data alone may not be enough for content consumers to understand a competitive gaming event or to maintain interest in site content. The amount of resources, in both personnel and technology, required to create meaningful stories from competitive gaming data may be cost prohibitive for most leagues and content publishers. Accordingly, there may be a need for an improved apparatus and methods for providing a natural language narrative about the various competitive gaming leagues, teams, competitors, and competitive events.

BRIEF DESCRIPTION OF THE DRAWINGS

FIG. 4 illustrates a story type structure in accordance with one or more embodiments.

DETAILED DESCRIPTION

Figure 1:
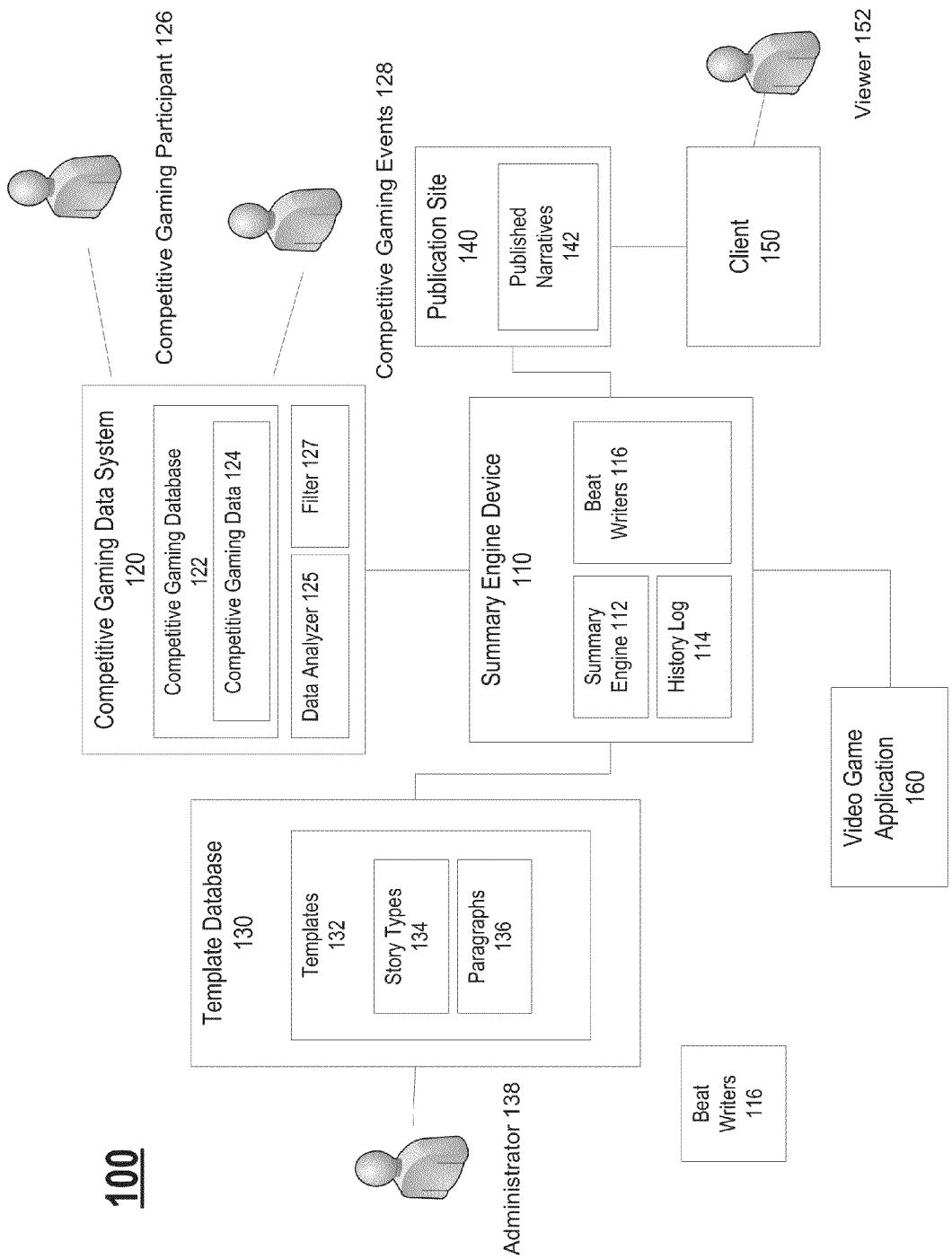
FIG. 1 illustrates a first system for providing competitive gaming narrative content in accordance with one or more embodiments.

Competitive gaming, or eSports, now attracts a large audience of devoted participants and followers. At any given time there are a multitude of competitions, tournaments, and competitive gaming events occurring in both physical gaming venues and in online competitions. The competitions may be dedicated to one or more games, such as the highly popular StarCraft®, Halo®, Call of Duty®, FIFA Soccer, and Madden NFL® franchises, and computing devices, such as personal computers (PCs) and proprietary gaming consoles, including the Sony PlayStation® and the Microsoft Xbox®. Participants may play alone or in teams in competitions that are commonly arranged through competitive gaming leagues, such as Major League Gaming (MLG), Global StarCraft® League, Collegiate Starleague, IGN Pro League, and the World Cyber Games (WCG).

Each competitive event generates volumes of data pertaining to the competition, the competitors, events that occurred during game play, game operational data, and data generated during competitive game play. For example, competition data may include information pertaining to teams, competitors, location, prize money, tournament brackets, and computing devices utilized by competitors. Data generated during competitive game play may involve events that occurred during the game, including information regarding use of ammunition, character interaction, performance of game objectives, changes in character features (e.g., health, weapons, spells, scores, skills, etc.).

Whether occurring in a physical or virtual space, a lot of interest is generated regarding the overall results of video game competitions and the individual competitors themselves. As such, online content publishers, such as competitive gaming leagues and gaming web sites, may benefit from providing content related to competitive gaming events. However, data and statistics alone are insufficient for generating and maintaining user interest. Instead, the data may be better presented within a body of narrative content as often structures game statistics for professional sports, such as Major League Baseball® (MLB®) and the National Football League (NFL®). Writing and preparing narrative content for the numerous competitive gaming events and competitors would prove overwhelming and cost-prohibitive for online content publishers. Accordingly, it would be extremely beneficial to provide efficient and effective techniques for producing narrative content for competitive gaming leagues, teams, competitors, and events.

Various embodiments are directed to techniques for generating narrative content about competitive gaming, similar to stories that a journalist might write for a relevant news publication. The embodiments may automatically generate content, including narrative stories or summaries, from data generated by one or more competitive gaming entities or competitive gaming events. The content may be generated using templates that have slots for data and dynamic word choices. Templates may also include conditions that determine a word choice for a dynamic word slot. Various aspects of the templates may be selected randomly, to create the impression that the story is human-generated.

The content may be published in various formats. The content may be published at irregular intervals, to simulate human-generated content. In an embodiment, the amount of stories generated about a particular competitive gaming league, competitor, game, game character, tournament, competition, or other event may be dependent on the frequency, amount of activity, or level of interest associated therewith. Embodiments may generate narrative stories about the events, data, or combinations thereof that make the event and data more understandable and approachable for the story consumer. The narrative stories may also generate interest in viewing other aspects of a publishing site, potentially increasing viewing traffic and advertising revenue.

In general, competitive gaming involves the playing of video games in a competitive environment. The competitive environment may be established through a league, a tournament or competition organizer, or through individual teams or competitors establishing competitive matches. For instance, certain leagues, content providers, and video game developers provide physical and virtual venues for competitive play, such as through established competitions and circuits. An exemplary competitive circuit is the Major League Gaming Pro Circuit focused on competitive play of the StarCraft® franchise. In addition, teams and individuals may set up matches through services provided by league websites and online content providers or through other communication methods, such as Internet relay chat (IRC) networks. Competitive environments and competitors may further be segmented based on the professional or amateur status of the participants.

Competitive events may include, without limitation, leagues, tournaments, circuits, contests, tests, matches, and so forth. Data may be generated during these competitive events on an individual, team, league, regional, competition, and character level. Exemplary data may include, but is not limited to, wins, losses, head-to-head match ups, scores, kills, goals, medals, objectives attained or failed, game elements located, levels, spells, character interaction, character features, dates and times, game times (e.g., time to finish a level), scores, goals, ammunition, weapons, fights, health, currency, and prize winnings. The embodiments are not limited in this context.

FIG. 1 illustrates a competitive gaming content narration system 100 arranged to generate narrative summaries of events automatically based on data about the event. In an embodiment, competitive gaming content narration system 100 may use templates that include slots for data and for dynamic word choice. The templates may be chosen randomly. A sub-set of templates may be chosen according to criteria, and a template may be chosen randomly from the sub-set. Once the template is filled out to create a story, the story may be published in a variety of locations and formats.

In one embodiment, for example, the competitive gaming content narration system 100 may comprise a computer-implemented system having multiple components, such as a summary engine device 110, a competitive gaming data system 120, a template database 130, a publication site 140, and a video game application data set 160. According to embodiments, the video game application data 160 may be comprised of information pertaining to one or more video game titles, including application data (e.g., program, module, specification information) and news content such as release information and cheat codes. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the competitive gaming content narration system 100 may be implemented by one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a video game console (e.g., Sony PlayStation®, Microsoft Xbox®), a notebook computer, a handheld computer, a tablet computer, a server, a server array or server farm, a web server, a network server, an Internet server, a work station, a mini-computer, a main frame computer, a super-computer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the competitive gaming content narration system 100 as shown in FIG. 1 has a limited number of elements in a certain topology, it may be appreciated that the competitive gaming content narration system 100 may include more or less elements in alternate topologies as desired for a given implementation.

The computing entities or devices of competitive gaming content narration system 100 may be communicatively coupled via a network, which may be implemented via various types of communications media, including wired or wireless communications media. The network may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The computing entities or devices of the competitive gaming content narration system 100 may include various types of standard communication elements designed to be interoperable with the network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between computing entities or devices of the competitive gaming content narration system 100 can be in the form of a data packet adapted to be transmitted between two or more computer processes. The data packet may include a cookie and/or associated contextual information, for example.

In an embodiment, competitive gaming content narration system 100 may include summary engine device 110. Summary engine device 110 may include one or more electronic devices that are capable of receiving video game data and data about video game competitive events, selecting a template, populating the template, and publishing the populated template. In particular, summary engine device 110 may include a summary engine 112. Summary engine 112 may include programming instructions that, when executed on a logic device, such as a processor circuit, may populate the slots in a template and publish it. Summary engine 112 is described further with respect to FIG. 6.

Summary engine device 110 may further include a history log 114. History log 114 may keep track of what content has already had a story generated about it, and/or what templates have been used and when. Summary engine 112 may refer to history log 114 when generating a story to prevent duplication of content, and to prevent re-use of a template that was recently used. Re-use of a template too soon may erode the effect that a human is generating the content.

Summary engine device 110 may further include one or more beat writers 116. A beat writer 116 may be a functional construct that represents a computerized author. A beat writer 116 may be customized to create a writing "personality" that may generate articles that are different from articles written by a differently customized beat writer 116. Summary engine 116 may use a beat writer 116 to specify and constrain the content and style of writing used to generate narrative summaries.

A beat writer 116 may be created by a competitive gaming league, competition organizer, video game developers, and/or by content publisher developers. A competitive gaming league, such as through a manager or developer, may configure settings that may apply to all beat writers 116 within a league and participants in the league. For example, a competitive gaming league may specify certain factors a competitive gaming participant 126 or competitive gaming event 128 must have before a beat writer 116 may write about that participant 126 or competitive gaming event 128, and/or connect a frequency of participant activity to a frequency of publication by a beat writer 116. According to embodiments, factors may include the frequency and/or amount of activity or level of achievement (e.g., number of wins, a win at a prestigious competition, number of points scored, level achieved, etc.). A competitive gaming participant 126 may be comprised of any entity involved in generating video game data 124, 126, including, but not limited to, individual players, teams, sponsors, or competitive event organizers. A competitive gaming league, competition organizer, or content publisher developer may allow competitive gaming event participants 126 to select whether they want to be followed by a beat writer 116. A competitive gaming league, competition organizer, or content publisher may assign a beat writer 116 to all competitive gaming event participants 126 or competitive events 128. An example of a beat writer is described further with respect to FIG. 4.

Competitive gaming content narration system 100 may include competitive gaming data system 120. Competitive gaming data system 120 may be a component of summary engine device 110, or may operate on a different device accessible over communication media to summary engine device 110. While only competitive gaming data system 120 is shown, embodiments may include multiple competitive gaming data systems 120, storing data for competitive gaming leagues, competitions, video game titles, and competitors.

Competitive gaming data system 120 may include competitive gaming data 124. Competitive gaming data 124 may be a database that includes any data used in or generated during the operation of a competitive gaming event 128. Competitive gaming data 124 may include data, such as historical data, for a plurality of competitive gaming event participants 126 and competitive events 128. For any one competitive gaming participant 126 or competitive gaming event 128, competitive gaming data 124 may include, without limitation, player names, sponsor names, league names, team names, organizer names, player and/or team performance metrics for one or more competitive events 128, wins, losses, head-to-head matchup results (e.g., wins and losses of a competitor or team against a particular competitor or team), video games played, kills, goals, objectives attained or failed, game elements located, levels, spells, character interaction, character features, dates and times, game times (e.g., time to finish a level), scores, ammunition, weapons, fights, health, currency, prize winnings, replays, beat writer 116 configurations, recent transactions affecting the competitive gaming event participant 126, competition location, competition sponsor, competition computing devices (e.g., type of gaming console or PC used for competition), competition dates and times, number of competitors, competition format, and so forth. Competitive gaming data 124 may also include data about a competitive gaming participant 126 over time, such as increases or decreases in winning percentage, accumulation of prize winnings, and so forth. The embodiments are not limited to these examples.

Competitive gaming data system 120 may include competitive gaming database 122. Competitive gaming database 122 may include any data used in the configuration and management of a competitive gaming event 128. Competitive gaming database 122 may include, without limitation, competitive event rules, regulations, deadlines, team and league configurations, game play settings (e.g., competition levels, parameters, limitations), beat writer 116 configurations for the competitive gaming event participants 126 and competitive events 128, and types of permitted actions, schedules, participant information, and so forth. In an embodiment, competitive gaming data 124 may be a component of competitive gaming database 122.

Competitive gaming event participants 126 may include users who register with competitive gaming data system 120, for example, to participate in a league or particular competitive gaming event 128. Illustrative and non-restrictive examples of competitive gaming event participants 126 include leagues, league organizers, league managers, teams, players, and competitive event sponsors. Competitive gaming event participants 126 may be individually identifiable to competitive gaming data system 120, and may need to authenticate themselves to competitive gaming data system 120 before engaging in leagues, web sites, or competitive events 128. Competitive gaming events 128 may include, without limitation, leagues, circuits, matches, tournaments, tests, and competitions.

Competitive gaming data system 120 may further include a data analyzer 125. Unlike "real" sporting events, such as a soccer game, e-sports are digital in nature. As such, almost any measurable characteristics, properties, attributes or aspects of an e-sport game may be captured in electronic form. For instance, the video game application 160 may generate tremendous volumes of data relating to almost every imaginable aspect of a video game, ranging from a system or system platform on which the video game application 160 executes to an atomic structure of a particular game itself. This results in generation of massive volumes of data that may be captured and stored as competitive game data 124 in the competitive gaming database 122. To take advantage of this plethora of data, the competitive gaming data system 120 may implement a data analyzer 125 specifically designed to data mine the competitive gaming data 124 for interesting trends or data that might be used by the beat writer 116 of the summary engine device 110. In one embodiment, for example, the data analyzer 125 may comprise a statistical analysis software package designed to perform numerical analysis and associated operations, such data retrieval, data management, data mining, report writing and graphics, forecasting, operations research, data warehousing (e.g., extract, transform, load), and so forth.

In one embodiment, the data analyzer 125 may be arranged to perform data mining operations. In general, data mining is a process that attempts to discover patterns in large data sets. It utilizes methods at the intersection of artificial intelligence, machine learning, statistics, and database systems. The overall goal of the data mining process is to extract information from a data set and transform it into an understandable structure for further use. Aside from the raw analysis step, it involves database and data management aspects, data preprocessing, model and inference considerations, interestingness metrics, complexity considerations, post-processing of discovered structures, visualization, and online updating, among other factors. One goal of the data analyzer 125 is to detect new patterns. The data analyzer 125 may perform an automatic or semi-automatic analysis of large quantities of data to extract previously unknown interesting patterns such as groups of data records (cluster analysis), unusual records (anomaly detection) and dependencies (association rule mining). This usually involves using database techniques such as spatial indexes. These patterns can then be seen as a kind of summary of the input data, and may be used in further analysis or, for example, in machine learning and predictive analytics.

In operation, the data analyzer 125 may analyze the competitive gaming data 124 in real-time or as stored in the competitive gaming database 122 in order to gather statistics or detect patterns of relevance to e-sports. For instance, the data analyzer 125 may detect patterns such as a gamers favorite location within a game, a number of head shots in a first-person shooter, trends in gaming perform, habits of actual gamers (e.g., human players), and so forth. These are non-traditional patterns that might be difficult to track in a real sports or game environment, partially due to a need for manual intervention, and yet can be detected from the larger data sets generated by the video game application 160.

Competitive gaming data system 120 may further include one or more filters 127. A filter 127 may be used process a data stream to remove or isolate certain types of competitive gaming data 124 for delivery to the summary engine device 110. A number of configurable filter parameters may be set for the filter 127 to increase or decrease an amount and type of data that is delivered to the beat writer 116. As new factors for a competitive gaming participant 126 or competitive gaming event 128 are detected by the data analyzer 125, or some external source, these factors may be extracted from the competitive gaming data 124 and delivered to the beat writer 116. This allows an administrator or user to refine and update a volume, frequency and type of information produced by the beat writer 116 as a published narrative 142.

Competitive gaming content narration system 100 may include template database 130. Template database 130 may be stored on summary engine device 110, or may be stored on a different device accessible over communication media to summary engine device 110. Template database 130 may include templates 132.

In an embodiment, templates 132 may include story types 134 and paragraphs 136. A story type 134 may be a container for various narrative structures. A story type 134 may, for example, include different lists of words and different paragraph types to choose from. Selecting a particular story type 134 from among multiple story types 134 may constrain the choices when building a story from templates 132. Paragraphs 136 may include specific sets of sentences that include both static text and slots for dynamic data and/or word choices. Story types 134 are described further with respect to FIG. 4. Paragraphs 136 are described further with respect to FIG. 5.

Templates 132 may be generated by an administrator 138. An administrator 138 may be a person who writes the sentences and paragraphs that may be included in a template 132. Administrator 138 may further create lists of words that may be used to fill a dynamic word slot. Administrator 138 may also set conditions that, when satisfied, direct a choice during a story generation. In an embodiment, administrator 138 may be partly or completely automated using a computer application.

Competitive gaming content narration system 100 may include a publication site 140. Publication site 140 may be a component of summary engine device 110, or may be separate from summary engine device 110. Publication site 140 may include, without limitation, a website, a real simple syndication (RSS) feed, an e-mail message, a news ticker, a social networking/media/news site, a short messaging service (SMS) message, a multimedia messaging service (MMS) message, a text-to-speech telephone message, a radio broadcast, an image file, a video stream, and combinations thereof.

Publication site 140 may include published narratives 142. Published narratives 142 may include a representation, for example, text, audio, and/or video, of a template 132 that has been filled with competitive gaming data 124. Published narratives 142 may be presented from, without limitation, hypertext markup language coded pages such as pages coded with the $5^{th}$ major revision to the hypertext markup language (HTML5) or the extensible markup language XML as defined by the World Wide Web Consortium (W3C), Java® applets, Javascript®, plain text, or a combination thereof. Published narratives 142 may be presented as an audio stream generated by a text-to-speech conversion from a filled template. Published narratives 142 may be presented as a video stream created from a computer image, such as an avatar, "speaking" the story from a text-to-speech conversion from the filled template. The embodiments are not limited to these examples. While one publication site 140 is shown in FIG. 1, embodiments may include multiple publication sites 140, for example, for each different type of publication. In an embodiment, published narratives 142 may be stored (e.g. as an archive), on a publication site 140, summary engine device 110, competitive gaming database 122, or some combination thereof.

In an embodiment, publication site 140 may publish published narratives 142 at irregular intervals, for example, at randomly selected times, to simulate the somewhat random nature of publication by human journalists. When multiple narrative summaries about a team are generated at once, publication of some of the narrative summaries may be delayed. This may also encourage viewers 150 to check back at publication site 140 more frequently. In an embodiment, summary engine 112 may control when narrative summaries are published to publication site 140. In an embodiment, a publishing "schedule" may be in part random, and in part event driven by one or more publishing plans. For example, most publication may appear randomly, except when a breaking news story occurs. In another example, publications may increase as the scheduled date for a competitive gaming event 128 nears or following the completion of a competitive gaming event 128.

In an embodiment, publication may take place on publication sites 140 that are external to competitive gaming data system 120, for example, blog posts on a league participant's personal blog, or on a social networking site including, but not limited to, Windows® Live Messenger®, Facebook®, Google+™, Google Chat™, Twitter®, MySpace®, Diaspora, and Digg®. Publication on external sites may allow others, such as those who are not competitive gaming event participants 126, to subscribe or follow content generated by summary engine 112. In an embodiment, summary engine 112 may be aware of how many followers a beat writer 116 may have, and may adjust a publishing schedule accordingly. For example, a beat writer 116 with many followers may publish more frequently than a beat writer 116 with fewer followers.

Competitive gaming content narration system 100 may include a client device 150. Client device 150 may be a wired or wireless computing device operating a browser, application viewer or other application program suitable for receiving and displaying published narratives 142 from publication site 140. Client device 150 may receive and respond to control directives from a viewer 152 via a suitable GUI and various input/output (I/O) devices, such as input from an input device that causes a browser to connect to publication site 140 and received a published narrative 142. Examples of suitable web browsers may include, without limitation, Internet Explorer® by Microsoft® Corp., Safari® by Apple Inc., or Chrome® by Google®, among others.

In an embodiment, viewer 152 may also be a competitive gaming event participant 126, and may use client device 150 to interact with competitive gaming data system 120. Viewer 152 may not be a competitive gaming event participant 126, but may still be able to view published narratives 142 from client device 150.

Competitive gaming content narration system 100 may include one or more databases from which published narratives 142 may be generated. In one embodiment, competitive gaming content narration system 100 may include, without limitation, a video game application data set 160 comprising information pertaining to one or more particular video games. For example, the video game application data set 160 may contain, without limitation, data consisting of updates, revisions, industry news and information, developer news and information, commentary, reviews, cheat codes, guides, and tutorials focused on the one or more particular video games. In an embodiment, when a new entry is made in the video game application data set 160, summary engine 112 may be notified so that a published narrative 142 may be created about the news. For instance, if a new release of a popular gaming franchise is announced or a prominent content publisher has reviewed a new game, summary engine 112 may publish a narrative 142 about the information.

Figure 2:
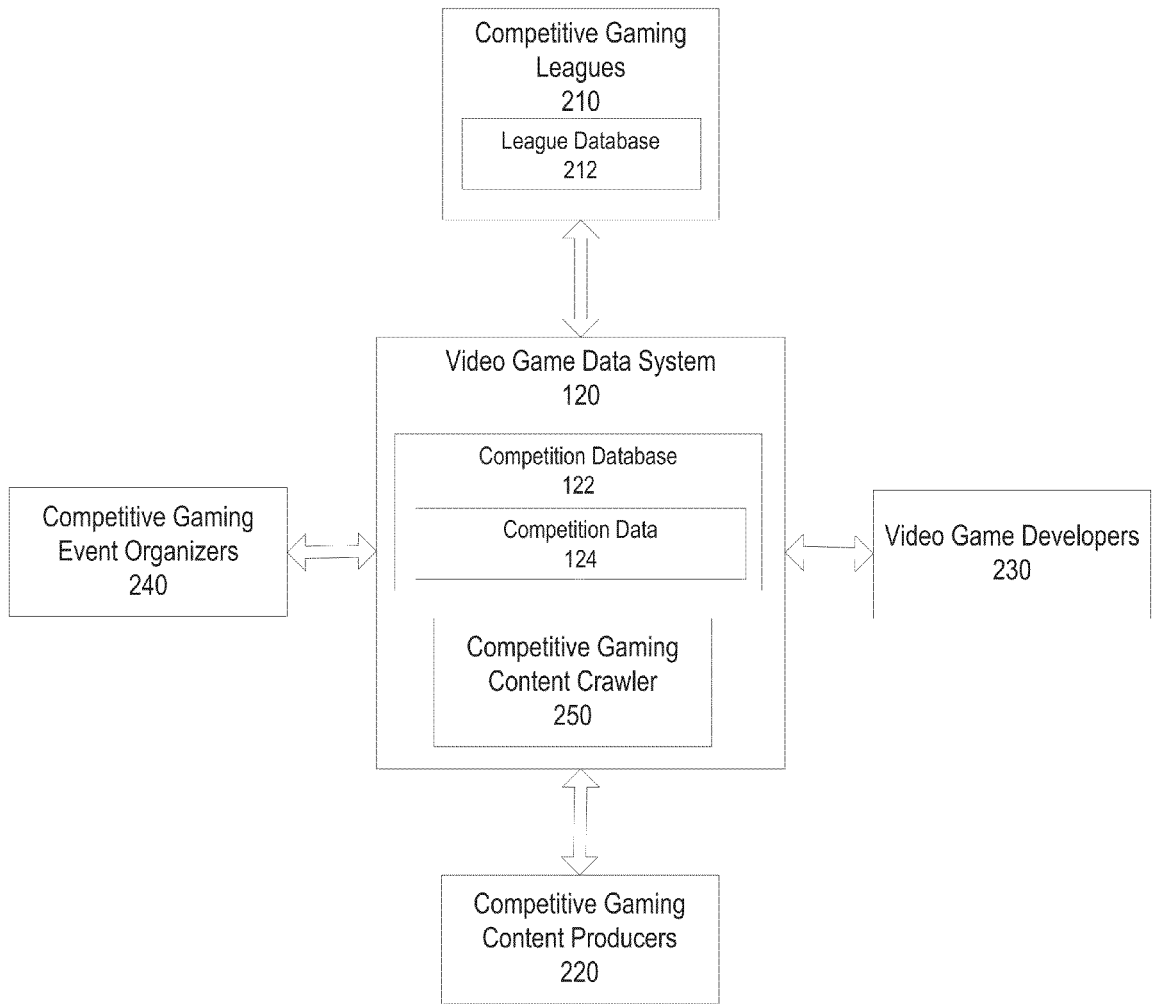
FIG. 2 illustrates an operating environment for a competitive gaming content narration system.

FIG. 2 provides an example operating environment 200 for the competitive gaming content narration system 100 according to an embodiment. More particularly, operating environment 200 presents data sources for a competitive gaming data system 120 for an embodiment.

The competitive gaming data system 120 may be comprised of a competitive gaming database 122 storing competitive gaming data 124. The competitive gaming database 122 may be configured to store information pertaining to competitive gaming events 128 and competitive gaming participants 126. The competitive gaming data system 120 may be in communication with multiple data sources. As shown in FIG. 2, example data sources may include competitive gaming leagues 210, competitive gaming content producers 220, video game developers 230, competitive gaming event organizers 240, or some combination thereof. In one embodiment, the competitive gaming data system 120 may have access to one or more databases, such as a league database 212. Data from the league database 212 may be copied to the competitive gaming database 122 or may be accessed by the competitive gaming content narration system 100 on an as-needed basis.

The data sources may be in operation with the competitive gaming data system 120, for example, supplying data feeds and/or allowing data access by the competitive gaming data system 120. For instance, the competitive gaming event organizers 240 may feed data pertaining to a competitive gaming event 128 to the competitive gaming data system 120 for use in generating stories. In another example, the video game developers 260 may supply industry information or video game application data for use in generating stories. In one embodiment, the competitive gaming data system 120 may be comprised of an online content crawler 250 configured to scan online resources for information pertaining to competitive gaming, such as content published by content publishers, including news, sports, and social media content providers as well as competitive gaming content producers 220 (e.g., web sites providing competitive gaming content, articles, links, etc.). Data from the various data sources (e.g., data sources 210, 220, 230, and 240) may be structured according to various formats. Embodiments provide that the competitive gaming data system 120 may be configured to accept data in various forms and to format the data to operate according to the detailed description provided herein.

Figure 3:
FIG. 3 illustrates a beat writer in accordance with one or more embodiments

FIG. 3 illustrates a beat writer 300 in accordance with one or more embodiments. Beat writer 300 may be a representative embodiment of a beat writer 116. Beat writer 300 may include one or more settings, such as personal traits 310, style/personality 320, content type 330, and publication settings 340. Beat writer 300 may have more, fewer, or other settings than those depicted.

Personal traits 310 may include settings that anthropomorphize a beat writer 300. Personal traits 310 may include, for example, a name, a face, a voice, a video avatar, a title, a gender, a preferred video game application or franchise, a preferred gaming system (e.g., PC, type console system), expertise with a video game application or gaming console, a league affiliation, and so forth.

Style/personality 320 may include settings that may determine which templates are selected and what kinds of inputs are used. Examples of style/personality 320 include "critical", "optimistic", "overly optimistic", "pessimistic", "pragmatic", "factual", "verbose," and so forth. A beat writer 300 with an "optimistic" style/personality 320 may write about video games and competitive events in a more positive light. A beat writer 300 with a "factual" style/personality 320 may report the facts of an event without additional emotional or descriptive content. The embodiments are not limited to these examples.

Content type 330 may include settings for the types and formats of the published narratives 142 that beat writer 300 may generate. Content type 330 may include, for example, articles, news ticker blurbs, radio interviews, quick summaries of an event, and so forth. A beat writer 300 may have more than one content type 330 selected.

Publication settings 340 may include settings that determine where published narratives 142 may be published, e.g. at which publication sites 140. Examples of publication sites 140 may include, without limitation, a website, a competitive gaming website home page, a video game developer home page, a real simple syndication (RSS) feed, an e-mail message, a news ticker, a social network site, a short messaging service (SMS) message, a multimedia messaging service (MMS) message, a text-to-speech telephone message, a radio broadcast, and a video stream.

According to embodiments, certain competitive gaming event participants 126 may specify what frequency and/or amount of activity a competitive gaming participant 126 or competitive event must have before a beat writer 116 may write about that participant's team, and/or connect a frequency of participant activity to a frequency of publication by a beat writer 116. For example, a competitive gaming participant 126 or competitive gaming event 128 that interacts with or drives interest in the competitive gaming data system 120 more often (e.g., interacts every day or is associated with a website having a certain level of traffic) than average may be rewarded by having more stories written about them. A competitive gaming participant 126 who only interacts with the competitive gaming data system 120 once a week or who does not participate in a certain minimum number of competitive gaming events 128 may have much fewer stories written about them, in comparison. Other activities that may be "rewarded" with more beat writer coverage may include the number of participants for a competitive gaming event 128, sponsor importance, prize winnings, inviting others to register with competitive gaming data system 120 and so forth.

In an embodiment, a beat writer 300 may be configured to allow others to comment on the content published by the beat writer. A beat writer 300 may be configured to track how many views of a published narrative are received, or to allow others to rate and/or review a published narrative.

FIG. 4 illustrates a story type 400 in accordance with one or more embodiments. Story type 400 may be a logical container structure for various template components. A story type 400 may generally describe the story that is told by the story type. For competitive gaming stories, for example, different story types may include a breaking story, competitive event summary, a competitive event result, and individual player and team summaries. A competitive event summary may be a story type that describes a competitive event, such as the date and time, registration details and deadlines, prize money, competition video game title(s), and prominent players. A competitive event result story may be a story type that describes the results of the competitive gaming event 128, including tournament brackets, winners, losers, one-one-one matchup results, and performance metrics (e.g., scores, levels, etc.). Individual player and team summaries may be a story type that describes how individual players or teams fared in one or more competitions, how players and teams match up against each other, and statistics and win percentages. A breaking news story may involve a news story directed toward new information about a competitive event (e.g., competitive event announcement) or a video game title (e.g., new release, review, cheat code). Story types may be mixed and combined to generate a template 132 for an event.

As shown in FIG. 4, story type 400 may include one or more word categories 410. A word category 410 may be a container for sets of word lists 412. A word category 410 may be associated with properties such as a specific league or video game title.

A word list 412 may be a container (e.g. an array) for a set of word definitions 414. A word list 412 may optionally be bound to a data field from competitive gaming data 124 such that the value of a data element may affect word choice in filling in the template.

Word definitions 414 may include specific words or phrases, such as static text strings, that may be used in a paragraph. In one embodiment, a particular word list 412 may include word definitions 414 that are essentially synonyms. Selecting a particular word definition 414 from the word list 412 may therefore still convey the same meaning as any other word definition from the same word list 412, while providing variety among instances when the same sentence is used.

Word definitions 414 in a word list 412 that is bound to a data field may include a margin value. A margin value may include a range of values to which the data in the associated data field may be compared. When the data in the data field is within the margin for the word definition 414, a condition may be satisfied that causes the word definition 414 to be used. For example, the word "large" may be used to describe the number of participants for a particular competition when the number of participants is over a certain number (e.g., 300).

Story type 400 may also include one or more paragraph types 420. A paragraph type 420 may be a container for a set of paragraph definitions 422. A paragraph type 400 may describe the paragraph in some way, for example, by what data is presented, by what tone is conveyed, and so forth. A paragraph type 420 may optionally be tied to a specific competitive event element, such as a league, competitive gaming event 128, competitive gaming event participant 126, or video game title. A paragraph type 420 that is not tied to a specific competitive event element may be used for any event that uses the story type 400 containing the paragraph type 420.

Paragraph definitions 422 may include the actual paragraph "blueprint" or template. Paragraph definitions 422 may, for example, include specific sentences, including static text, and the template slots to receive data and word choices from word lists 412. An example of a paragraph definition 422 is described in further detail with respect to FIG. 5.

Story type 400 may also include one or more story flavors 430. A flavor may represent a style, tone, theme, or other grouping and structure of paragraphs in a story. A story flavor 430 may include a paragraph types set 432, which may be a list of references to a set of paragraph types 420 that may be used for a particular story flavor 430. A story flavor 430 may be optionally reserved for a specific competitive event element, or may be open to use for any event.

Figure 5:
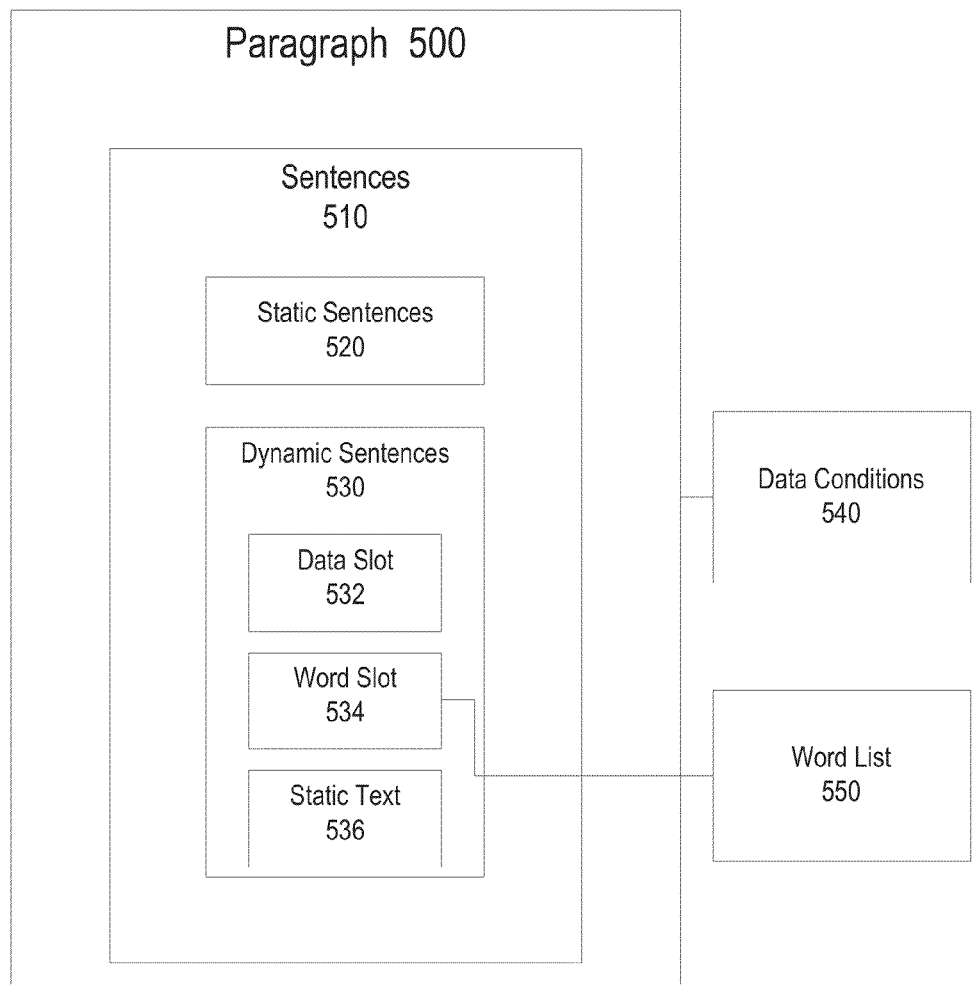
FIG. 5 illustrates a paragraph structure in accordance with one or more embodiments.

FIG. 5 illustrates a paragraph 500 in accordance with one or more embodiments. Paragraph 500 may be a representative example of a paragraph definition 422. As in written grammar, a paragraph 500 may be a group of closely related sentences that convey one topical point. As such, paragraph 500 may include one or more sentences 510.

Sentences 510 may include static sentences 520. Static sentences 520 may be sentences that have no variable elements. That is, none of the words in a static sentence 520 may be changed by summary engine 110.

Sentences 510 may include dynamic sentences 530. Dynamic sentences 530 may have at least one variable element. For example, a dynamic sentence 530 may have a data slot 532. A data slot 532 may be a placeholder in dynamic sentence 530 that may be filled with an item of competitive gaming data 124. A data slot 532 may exist, for example, for a league name, competitive event name, competitor name, video game title, scores, prize money, date, time, or location. A data slot 532 allows a dynamic sentence 530 to be re-used for multiple events.

Dynamic sentences 530 may include a word slot 534. A word slot 534 may be a placeholder in dynamic sentence 530 that may be filled with a word definition 414 from word list 550. Word list 550 may be a representative embodiment of word list 412. A particular word definition 414 may be selected to fill a word slot 534 randomly from word list 550. In an embodiment, word slots 534 may be used generally for adjectives, adverbs, verbs and some nouns.

A dynamic sentence 530 may include static words 536. Static words 536 are words that are not variable. Static words 536 may include, for example, articles, prepositions, and punctuation.

In an embodiment, sentences 510 may be affected by data conditions 540. Data conditions 540 may be used to control the flow of a story according to conditions in the competitive gaming data 124 for a story. A data condition 540 may generally have true or false value. A data condition 540 may determine which of several sentences or paragraphs are selected for a story. A data condition 540 may determine what word list 550 to choose from to fill a word slot 534. For example, if a particular competitor wins a competition, a paragraph type associated with a win event may be selected for a story about the particular competitor instead of a paragraph type that is associated with not winning a competition.

Figure 6:
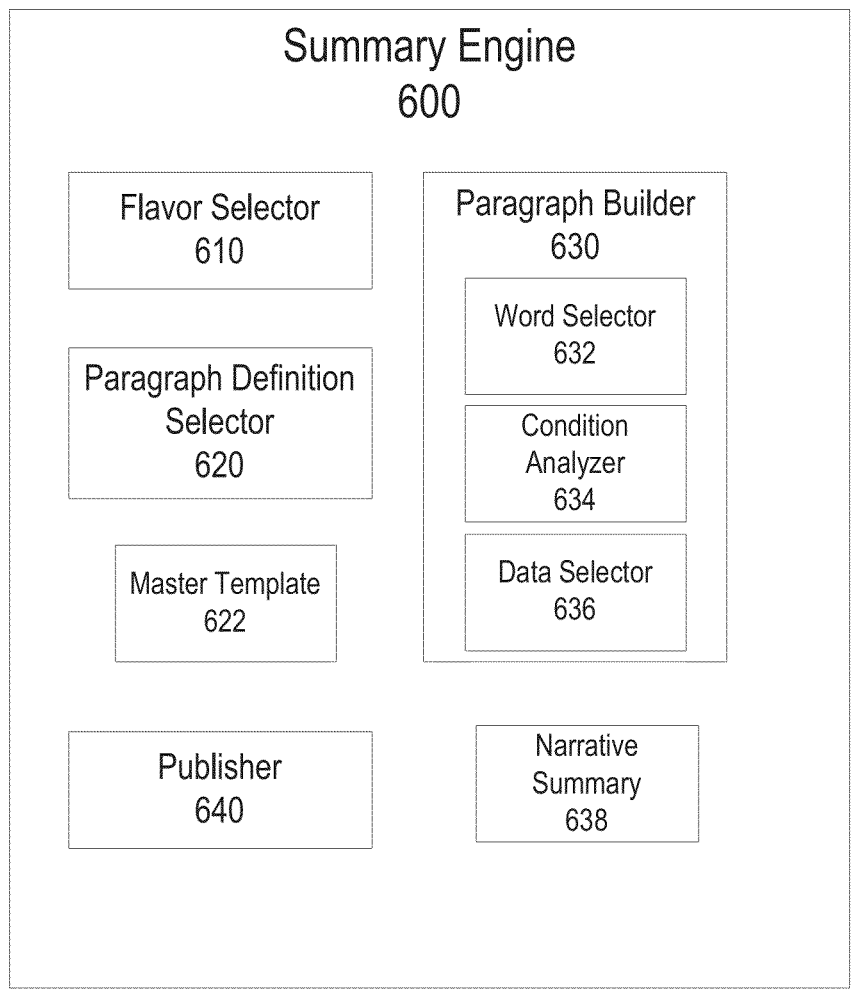
FIG. 6 illustrates a summary engine in accordance with one or more embodiments.

FIG. 6 illustrates an embodiment of a summary engine 600. Summary engine 600 may be a representative embodiment of summary engine 112. Summary engine 600 may include one or more functional components, such as a flavor selector 610, a paragraph definition selector 620, a paragraph builder 630, and a publisher 640. Summary engine 600 may have more, fewer, or other functional components than those depicted.

Summary engine 600 may periodically examine competitive gaming data 124 and identify new content in competitive gaming data 124 that has not had a narrative summary generated for it yet. In an embodiment, when new content exists, summary engine 600 may determine what story type would apply to the new content and whether all of the data needed for that story type is present. When enough new content exists for a story type 134, 300, summary engine 600 may begin generating a narrative summary.

Flavor selector 610 may select a story flavor 330 for the selected story type 134, 300. In an embodiment, the story flavor 330 may be chosen at random from the story flavors associated with the story type selected for the event data. In another embodiment, the story flavor 330 may be selected, at least in part, according to a set of criteria, for example, what competitive gaming data 124 is available, and/or what style/personality 320 the relevant beat writer 300 has.

Paragraph definition selector 620 may select a paragraph definition 422 for each paragraph type 420 associated with the selected story flavor 430. Paragraph definition selector 620 may randomly choose a paragraph definition 422 within a given paragraph type 420. In an embodiment, paragraph definition selector 620 may randomly select a paragraph definition 422 according to a set of criteria, for example, what competitive gaming data 124 is available and/or what style/personality 320 the relevant beat writer 300 has. The paragraph definitions 422 selected for a particular narrative summary may be appended together to form a master template 622.

Paragraph builder 630 may load a paragraph 500 for each of the paragraph definitions 422 in the master template 622. Paragraph builder 630 may parse the paragraph 500 to determine what word slots 534 and data slots 532 are to be filled. Paragraph builder 630 may have a word selector 632 component to select a word at random from a word list 550 associated with a word slot 534. Paragraph builder 630 may have a data selector 636 component to insert an actual data value from competitive gaming data 124 into a data slot 532. Paragraph builder 530 may have a condition analyzer 634 component to evaluate conditions that are present in a paragraph definition 422, or associated with a story flavor 430 or story type 400. When a condition is true, a choice associated with the condition is followed. For example, an additional sentence or paragraph may be added to master template 622, or one word list may be chosen instead of another. The embodiments are not limited to these examples.

When paragraph builder 630 has filled all word and data slots, and evaluated all conditions in master template 622, the result is narrative summary 638. Narrative summary 638 may be comprised of, for example and without limitation, a text file, a rich text file, an HTML file, an XML file, an image file, or some combination thereof.

Publisher 640 may receive the narrative summary 638 from paragraph builder 630 and may prepare the narrative summary 638 for publication. Preparing narrative summary 638 may include formatting the narrative summary 638 according to a format used by publication site 140. For example, publisher 640 may convert a text file narrative summary to an HTML file or XML file for publication on a website. In another example, publisher 640 may use text-to-speech conversion on a text file narrative summary to generate an audio stream. The embodiments are not limited to these examples.

Figure 7:
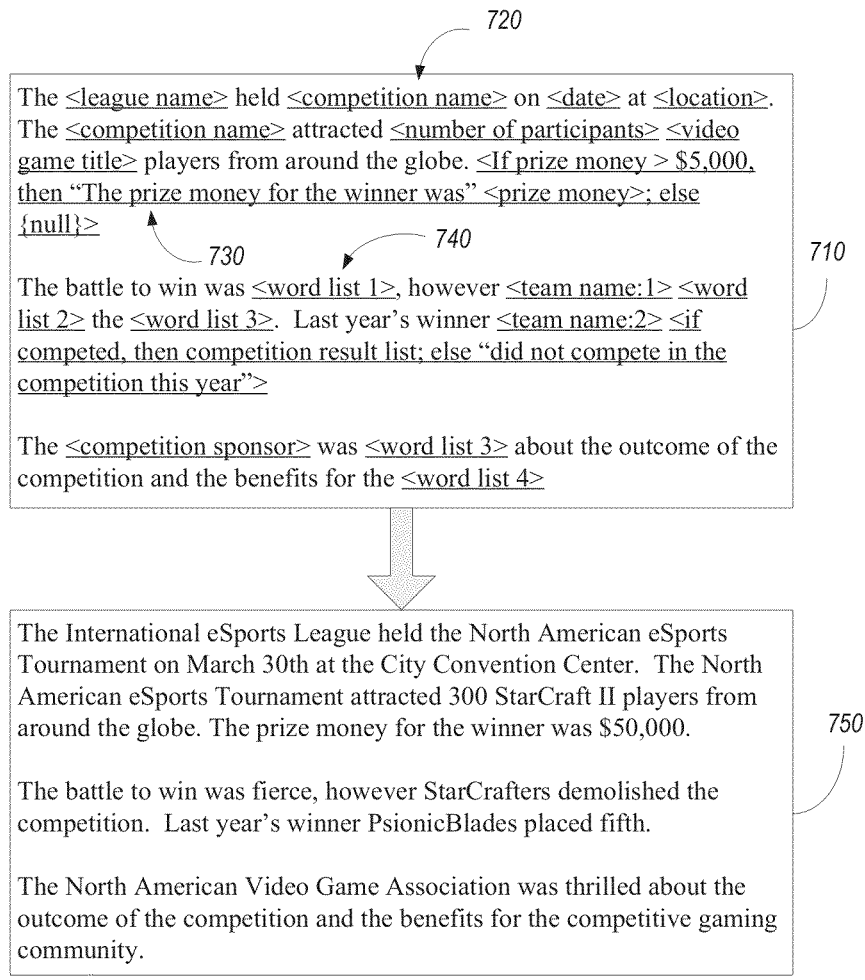
FIG. 7 illustrates an example of a template before and after a narrative summary is generated in accordance with one or more embodiments.

FIG. 7 illustrates an example of a portion of a master template 710, in pseudo code, before and after the word and data slots are filled. The portion depicted reports a trade transaction. Master template 710 has, for example, a data slot 720, a conditional word slot 730 and a word slot 740. Data slot 720 is a placeholder for a competition that is the subject of the story. Conditional word slot 730 has a condition that determines whether to display the prize money for the competition, depending on the amount of the prize money. If the prize money is too small (e.g., less than $5000), then the prize money is not mentioned; otherwise, the fact that there is prize money and the amount is included in the story. Word slot 740 indicates that a word is to be selected from word list 1. The sentences within master template 710 are shown spaced apart for clarity, and may be more closely spaced in an embodiment.

When master template 710 has been processed by paragraph builder 630, in an embodiment, it may look like narrative summary 750. In narrative summary 750, data slot 720 has been filled with the league name of "International eSports League." Conditional word slot 730 evaluated to "true" and the fact that there was prize money and the amount was included. Word slot 740 was filled randomly from word list 3 with the word definition "fierce." Word list 1 may include, adjectives positively or negatively describing the level of competition, such as "intense" or "lackluster." A differently configured beat writer 116, 300 may have had different word lists to select from, or a different paragraph altogether to report the same information. The embodiments are not limited to these examples.

Figure 8:
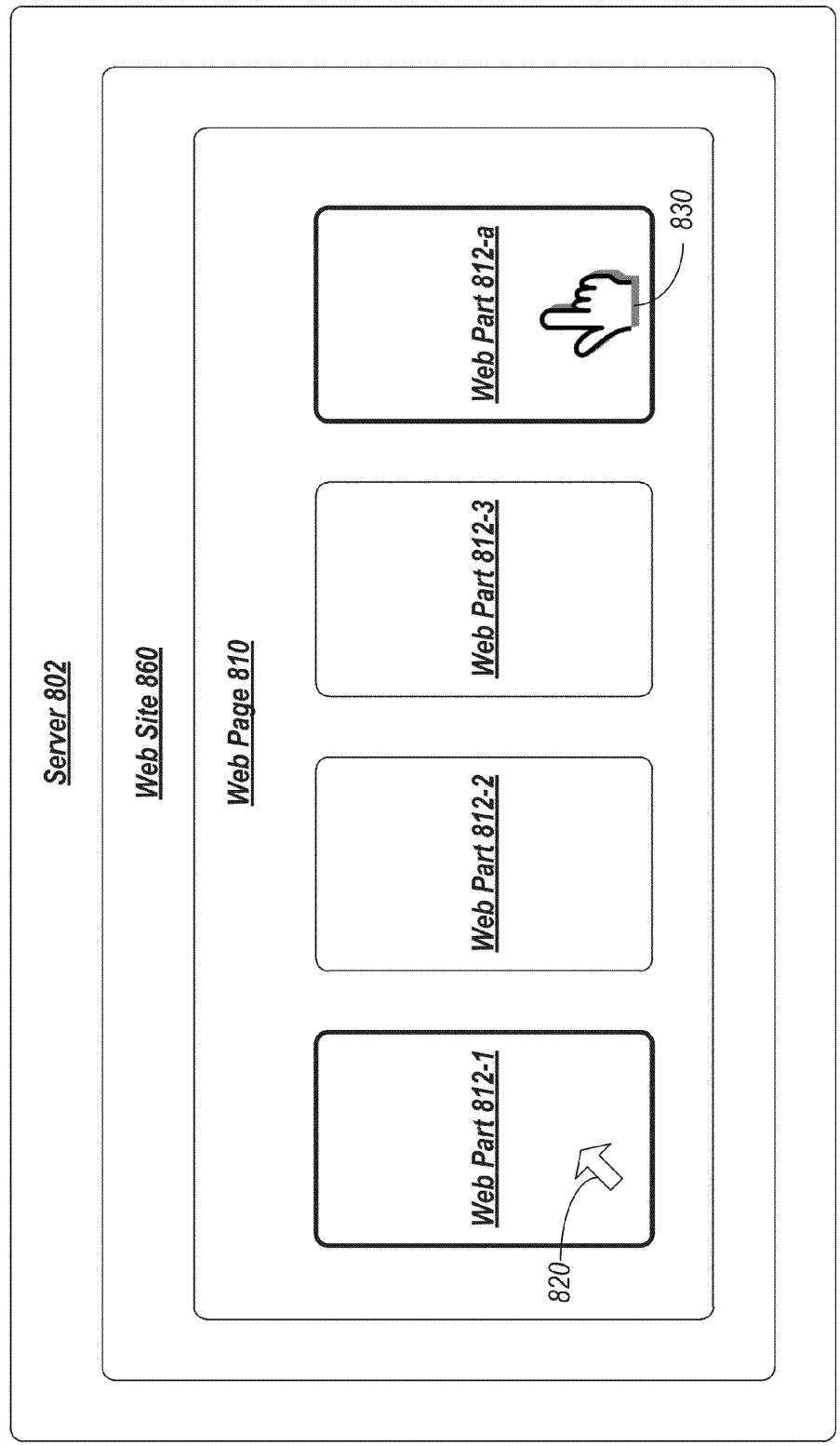
FIG. 8 illustrates an example of a user interface.

FIG. 8 illustrates an embodiment of a user interface view 800. The user interface view 800 illustrates an embodiment where a server 802 hosts content on a web site 860, which is implemented as one or more web pages 810. Server 802 and web site 860 may be representative embodiments of a publication site 140 and/or a competitive gaming data system 120 web site. The web page 810 may comprise, for example, a landing page or home page for web site 860. The web page 810 may include various user interface elements designated as web parts 812-a, with a representing any positive integer. A user, for example, viewer 152, may select various web parts 814-a using any number of input devices, such as by manipulating a pointer interface 820 or a gesture interface 830, for example.

Referring to FIG. 8, web site 860 may include a web page 810 that displays a published narrative 142. For example, web part 812-1 may display a published narrative 142, web part 812-2 may display another published narrative 142, and web part 812-a may display an advertisement for a product or service. Web part 812-3 may display graphical user interface (GUI) elements, links, and services, such as web site navigation links, viewer comments, a search interface, and so forth. Adding new published narratives 142 frequently may encourage viewers 152 to return to web site 860 often, which may increase advertising revenue from the increased traffic.

In an embodiment, web site 800 may keep track of what published narratives 142 are of interest to a particular viewer 152, for example, by noting which published narratives are read, shared, forwarded, and so forth. The tracking of published narrative 142 interest and popularity may be performed by methods known to those having ordinary skill in the art, such as through cookies, plug-ins, modules, and applications designed to track web traffic and content consumption. In an embodiment, web site 800 may provide feedback to summary engine 112 about viewer 152 interests and obtain published narratives that are more closely aligned to the interests of one or more particular viewers 152. The embodiments are not limited to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). Embodiments may also be at least partly implemented as instructions contained in or on a computer-readable medium, which may be read and executed by one or more processing units to enable performance of the operations described herein.

Figure 9:
FIG. 9 illustrates a logic flow in accordance with one or more embodiments.

FIG. 9 illustrates a logic flow 900 in accordance with one or more embodiments. The logic flow 900 may be performed by various systems and/or devices and may be implemented as hardware, software, and/or any combination thereof, as desired for a given set of design parameters or performance constraints. For example, the logic flow 900 may be implemented by a logic device (e.g., processor) and/or logic (e.g., threading logic) comprising instructions, data, and/or code to be executed by a logic device. For purposes of illustration, and not limitation, the logic flow 900 is described with reference to FIGS. 1 through 6. The embodiments are not limited in this context.

In various embodiments, logic flow 900 may receive data about a competitive gaming event in block 902. For example, summary engine 112 may scan, or request data from, competitive gaming data system 120 for new competitive gaming data 124 or competitive gaming database 122. Summary engine 112 may also scan, or receive data from, database 160. Summary engine 112 may also, or in the alternative, receive a notification from one or more of the databases 122, 160 that there is new data. "New" in the context of logic flow 900 may refer to data added to a database after a previous interaction with summary engine 112, or data that has not been used in a narrative summary before. Summary engine 112 may, in an embodiment, select a story type 300 and then scan one or more of the databases 122, 160 for new data that may be used for that story type.

In various embodiments, logic flow 900 may select a narrative template in block 904. For example, summary engine 500 may select a story type 300, story flavor 330, and paragraph definitions 322 to generate a master template 522. Selecting a narrative template is described further with respect to FIG. 10.

In various embodiments, logic flow 900 may fill data slots with data from the event in block 906. For example, data selector 536 may identify what data elements from competitive gaming data 124 may be used to fill in a data slot 532 and replace the data slot with the data in the master template 522.

In various embodiments, logic flow 900 may fill word slots with words selected according to the data from the event in block 908. For example, word selector 532 may select a word definition from a word list 550 for a word slot 534 and replace the word slot 534 with the word definition in the master template 522. In an embodiment, the selection of a word from a word list 550 may be random. At the conclusion of block 908, the master template 522 may be a narrative summary 538.

In various embodiments, logic flow 900 may publish the template with the slots filled in block 910. For example, publisher 540 may format a narrative summary 538 according to a publication site 140. For example, if publication site 140 is a web site, narrative summary 538 may be formatted as an HTML or XML document and stored on publication site 140 such that the narrative summary 538 is viewable as a published narrative 142 when the web site is accessed by a browser application on a client device 150. The embodiments are not limited to these examples.

Figure 10:
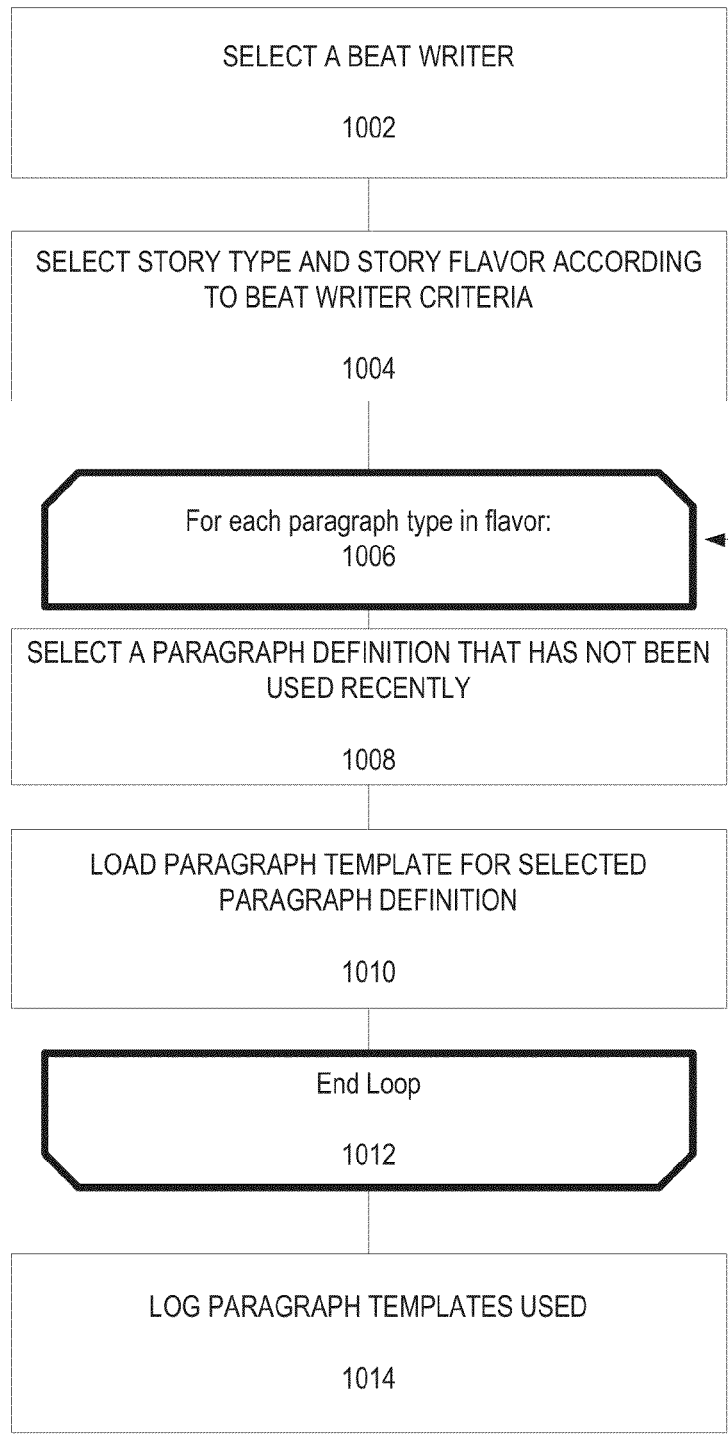
FIG. 10 illustrates a second logic flow in accordance with one or more embodiments.

FIG. 10 illustrates a logic flow 1000 in accordance with one or more embodiments. Logic flow 1000 may be a representative embodiment of block 904 in logic flow 900. Logic flow 1000 may be performed by various systems and/or devices and may be implemented as hardware, software, and/or any combination thereof, as desired for a given set of design parameters or performance constraints. For example, the logic flow 1000 may be implemented by a logic device (e.g., processor) and/or logic (e.g., threading logic) comprising instructions, data, and/or code to be executed by a logic device. For purposes of illustration, and not limitation, the logic flow 1000 is described with reference to FIGS. 1 through 6. The embodiments are not limited in this context.

In various embodiments, logic flow 1000 may select a story type according to criteria in block 1002. According to embodiments, a selected story type 400 may be comprised of word category 410, paragraph type 420, and story flavor 430 components.

In various embodiments, logic flow 1000 may select a story type and a story flavor according to beat writer criteria in block 1004. In an embodiment, the beat writer 116, 300 specified for a particular competitive event may constrain the story types available to choose from. Some beat writers 116, 300, for example, may not have a breaking news story type in their content type 330 settings. Summary engine 500 may select a story type 300 according to the beat writer criteria, e.g. style/personality 320 and/or content type 330. A story type 300 may be selected based on what data elements are available in competitive gaming data 124 received, or retrieved, from one or more of the databases 126, 160. For example, when data about results for a recently completed competitive event are available, a breaking news story type may be selected. When a story type 400 has more than one story flavor 430, a story flavor 430 may be selected randomly from the available choices, for example, by flavor selector 510. Beat writer criteria may be applied to the story flavors 430 for a story type 400 to narrow the available choices. Beat writer criteria may include, for example, a style/personality 320 setting that determines what story flavors a beat writer 116, 300 may use.

In various embodiments, logic flow 1000 may, beginning at block 1006, select a paragraph definition, for each paragraph type in the story flavor that has not been used recently, at block 1008. For example, paragraph definition selector 520 may use paragraph type set 432 for the selected story flavor 430. Paragraph type set 432 may include references or links to the paragraph types 420 that a story flavor 430 may use. Paragraph definition selector 520 may get a paragraph type 420 from the paragraph type set 432 of story flavor 430. Paragraph definition selector 520 may select a paragraph definition 422 for that paragraph type 420. Paragraph definition selector 520 may check history log 114 to determine how recently the selected paragraph definition 422 was used. If the selected paragraph definition 422 was not used within a threshold time period, e.g. one month, then the selected paragraph definition 422 may be used. Otherwise, that paragraph definition may be discarded and another selected.

In an embodiment, conditions within a paragraph definition 422 may be evaluated when a paragraph definition is selected to determine if additional paragraph definitions, or sentences, are to be appended to master template 522.

In various embodiments, logic flow 1000 may load a paragraph template for the selected paragraph definition in block 1010, for each paragraph type 420. For example, paragraph builder 530 may append a paragraph 500 to master template 522, including the static sentences 520, static text 536, data slots 532, and word slots 534 included in paragraph 500.

Blocks 1008 and 1010 may be repeated for each paragraph type 420 referenced in paragraph type set 432 for the selected story flavor 430. When a paragraph definition has been selected for each paragraph type, the loop beginning at block 1006 ends at block 1012.

In various embodiments, logic flow 1000 may log paragraph templates used in block 1014. For example, summary engine 112 may record in history log 114 what paragraph definitions 422 were used, and the date that they were used. Summary engine 112 may also note in history log 114, or directly in a database, what data was used to generate a narrative summary.

While the embodiments described herein refer primarily to video game competitive events, embodiments may be extended to apply to other sources of content. For example, statistically driven content including financial news, such as stock market information, may be a source for content for narrative summaries. In an embodiment, templates 132 may be created for financial news reporting, and one or more beat writers 116 may be created to follow financial news. A beat writer 116 may be prompted to write a story when events such as large or sudden changes in a stock price occur, volume increases, and so forth. In such an embodiment, summary engine 110 may monitor such sources as stock ticker information, financial news websites, and so forth, which may be analogous to competitive gaming data system 120 as sources for new content for a narrative summary.

Other sources of content may include political content. Political content may include, for example and without limitation, political race data; legislative actions, such as votes; primary election results; general election results; debates; fund-raising information; endorsements; electoral college votes; and so forth. Templates 132 may be generated for political reporting, and beat writers 116 may be created to follow political news. A beat writer 116 may be prompted to write a story, for example, when fund raising amounts are disclosed by a campaign, election results are final, a piece of legislation is voted on, and so forth. A beat writer 116 for politics may have characteristics such as a political party bias. In such an embodiment, summary engine 110 may monitor such sources as news feeds, campaign websites, press releases, polling statistical data, and so forth, which may be analogous to competitive gaming data system 120 as sources for new content for a narrative summary. The embodiments are not limited to these examples.

Other sources of content may include professional, amateur, high school, and collegiate sports. Sports content may include, but is not limited to, league information (e.g., NFL®, MLB®, National Hockey League (NHL®), National Collegiate Athletic Association (NCAA®)), games, teams, players, scores, scoring summaries, and trades. A beat writer 116 may write a story, for example, responsive to the completion of a game or in response to a trade. In such an embodiment, summary engine may monitor such sources as news feeds, sports web sites (e.g., CBS Sports®, ESPN®), team web sites, Twitter®, Facebook®, and other social media services which may be analogous to competitive gaming data system 120 as sources for new content for a narrative summary. The embodiments are not limited to these examples.

Figure 11:
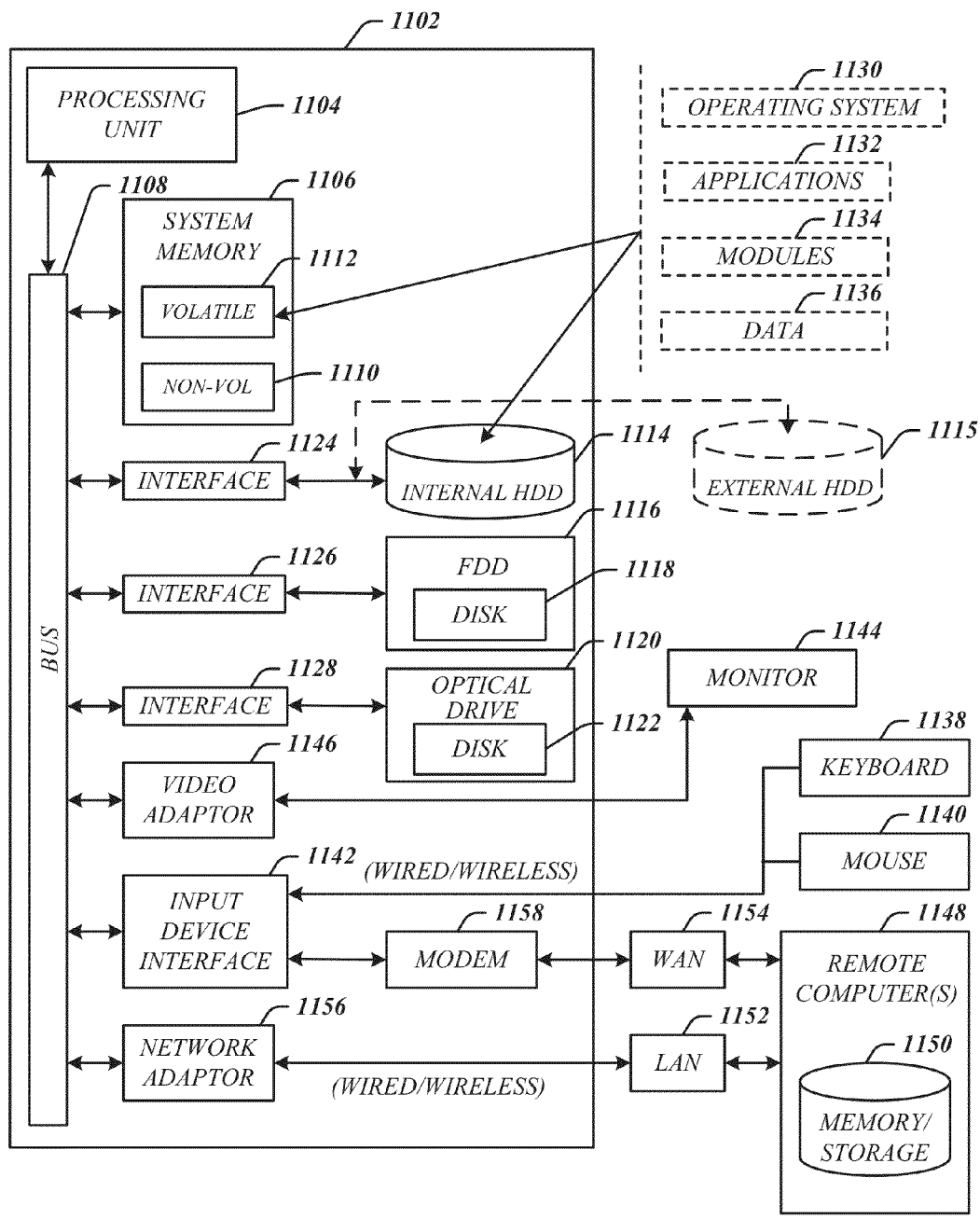
FIG. 11 illustrates a computing architecture in accordance with one or more embodiments.

FIG. 11 illustrates a computer architecture in accordance with one or more embodiments, suitable for implementing various embodiments as previously described. The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises logic device(s) 1104, a system memory 1106 and a system bus 1108. Examples of a logic device may include, without limitation, processing circuitry, such as a central processing unit (CPU), microcontroller, microprocessor, general purpose processor, dedicated processor, chip multiprocessor (CMP), media processor, digital signal processor (DSP), network processor, co-processor, input/output processor, application specific integrated circuit (ASIC), field programmable gate array (FPGA), programmable logic device (PLD), and so forth. Dual microprocessors and other multi-processor architectures may also be employed as the logic device(s) 1104. The system bus 1108 provides an interface for system components including, but not limited to, the system memory 1106 to the logic device(s) 1104. The system bus 1108 can be any of several types of bus structure that may further interconnect to a memory bus (with or without a memory controller), a peripheral bus, and a local bus using any of a variety of commercially available bus architectures.

The system memory 1106 may include computer-readable storage media including various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may additionally include various types of computer-readable storage media, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. The one or more application programs 1132, other program modules 1134, and program data 1136 can include, for example, summary engine 112, 700.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game controller, a game pad, a stylus pen, touch screen, or the like. These and other input devices are often connected to the logic device(s) 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 12:
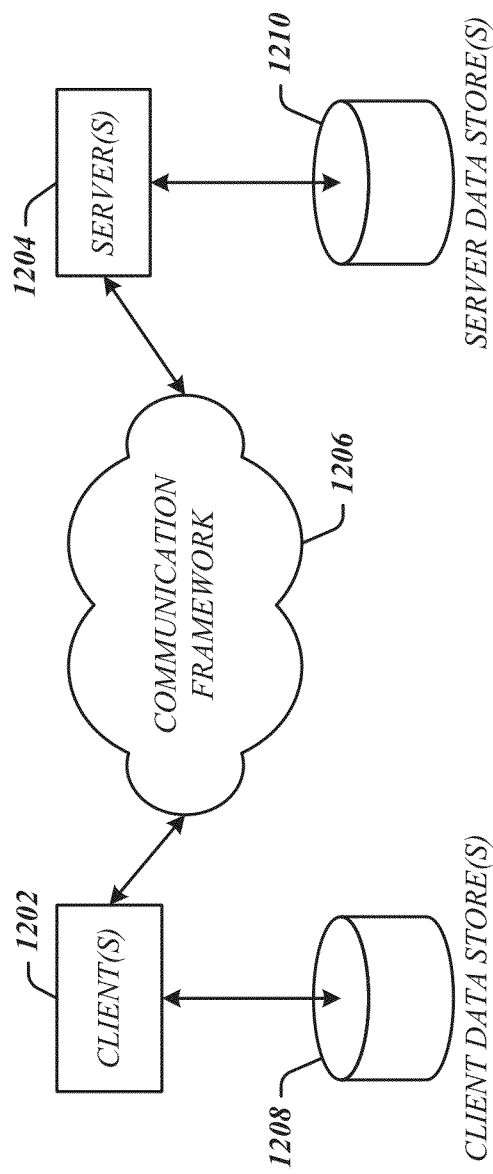
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 150. The servers 1204 may implement summary engine device 120, competitive gaming data system 120, and publication site 140. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1202 and the servers 1204 may include various types of standard communication elements designed to be interoperable with the communications framework 1206, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1202 and a server 1204 can be in the form of a data packet adapted to be transmitted between two or more computer processes. The data packet may include a cookie and/or associated contextual information, for example.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

References to "one embodiment" or "an embodiment" mean that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

What is claimed is:

1. A computer-implemented method comprising:
 receiving data about a competitive gaming event, the data comprising one or more data items;
 selecting, by a processor, a beat writer from a plurality of beat writers stored in a data store, wherein each of the plurality of beat writers represents a respective one of a plurality of different computerized authors, each configured for respectively different writing styles;
 selecting, by the processor, a story type from a plurality of story types based on the selected beat writer;
 selecting, by the processor, a story flavor from the one or more story flavors associated with the story type;
 selecting, by the processor, a narrative template for the competitive gaming event according to the data and story type, the narrative template comprising at least one paragraph from the set of paragraph types associated with the selected template story flavor, the at least one paragraph having one or more sentences, and one or more empty word slots within the one or more sentences, and one or more empty data slots within the one or more sentences;
 selecting, by the processor, for each of the one or more empty word slots, a word list configured for the word slot according to the selected beat writer;
 filling, by the processor, each of the one or more empty data slots in the narrative template with a data item from the one or more data items;
 filling, by the processor, each of the one or more empty word slots in the narrative template with a word selected from the selected word list configured for the word slot based on the competitive gaming data; and
 publishing, by the processor, the narrative template with the one or more empty word slots and the one or more empty data slots filled as a narrative summary of competitive gaming narrative content.

2. The method of claim 1, wherein the data is obtained from at least one of:
 a competitive gaming league;
 a competitive gaming event organizer;
 a competitive gaming content producer; and
 a video game developer.

3. The method of claim 1, further comprising logging at least one of: the narrative template selected, a date that the narrative template was selected, and the competitive gaming narrative content.

4. The method of claim 3, further comprising selecting a narrative template that has not been used within a specified time period.

5. The method of claim 1, further comprising publishing the narrative template at irregular intervals.

6. The method of claim 1, wherein publishing comprises at least one of:
 publishing to a competitive gaming league web site;
 publishing to an electronic mail message;
 publishing to a social network;
 publishing a text-to-speech version of the published narrative template to a radio feed stream;
 publishing a video comprising an avatar speaking a text-to-speech version of the published narrative template;
 publishing to a news ticker on at least one of: a website, a video, and a television program;
 publishing a press release; and
 publishing to a website external to a competitive gaming league website.

7. The method of claim 1, wherein the data comprises at least one of:
 a competition name;
 a league name;
 a competitor name;
 a team name;
 a date of the event;
 a time of the event;
 a competition result;
 a prize money value;
 a score;
 a video game level;
 a video game title; and
 a video game character.

8. The method of claim 1, wherein the competitive gaming event comprises a competitive gaming league, the competitive gaming league comprising a plurality of competitive gaming participants, the method further comprising:
 tracking at least one of a participation rate and a prize money amount of a competitive gaming participant at a competitive gaming web site; and
 publishing a filled narrative template for a competitive gaming participant at a rate according to the prize money amount associated with the competitive gaming participant.

9. An apparatus comprising:
 a logic device comprising a processor circuit;
 a first data store communicatively coupled to the logic device and configured to store narrative templates comprising a plurality of story types, wherein each of the story types is associated with one or more story flavors, and wherein each of the one or more story flavors comprises a set of paragraph types;
 a second data store communicatively coupled to the logic device and configured to store competitive gaming data;
 a summary engine executing on the logic device, configured to:

select a beat writer from a plurality of beat writers stored in at least one of the first data store and the second data store, wherein each of the plurality of beat writers represent a respective one of a plurality of different computerized authors, each configured for respectively different writing styles;

select a template story type from the plurality of story types based on the selected beat writer;

select a template story flavor from one or more story flavors associated with the template story type;

retrieve the competitive gaming data from the second data store;

construct a master template according to the template story type, the master template comprising at least one paragraph from the set of paragraph types associated with the selected template story flavor, the at least one paragraph having one or more sentences and one or more empty word slots within the one or more sentences; and fill each of the one or more empty word slots of the master template by selecting one or more words from a predetermined word list based on the competitive gaming data to generate a narrative summary of a competitive gaming event associated with the competitive gaming data; and a publishing engine, executing on the logic device, configured to:

publish the narrative summary with the one or more empty word slots filled as competitive gaming narrative content.

10. The apparatus of claim 9, wherein the master template comprises a condition, the summary engine, executing on the logic device, further configured to:
determine a state of the condition according to the competitive gaming data; and
select a first template sub-section to include when the condition is true and a second template sub-section to include when the condition is false.

11. The apparatus of claim 9, the publishing engine further configured to publish to at least one of:
a website;
a real simple syndication feed;
an e-mail message;
a news ticker;
a social network site;
a short messaging service message;
a multimedia messaging service message;
a text-to-speech telephone message;
an audio stream;
a video stream; and
a radio broadcast.

12. The apparatus of claim 9, wherein a beat writer comprises at least one of:
personal traits;
style;
personality;
content type;
publication settings;
league affiliation;
preferred video game title; and
preferred gaming system.

13. The apparatus of claim 9, wherein the competitive gaming data comprises at least one of:
a competition name;
a league name;
a competitor name;
a team name;
a date of the competitive gaming event;
a time of the competitive gaming event;
a competition result;
a prize money value;
a score;
a video game level;
a video game title; and
a video game character.

14. The apparatus of claim 9, the summary engine further configured to:
select a beat writer according to at least one of: style, personality, content type, video game title expertise, video gaming system expertise, and league affiliation.

15. The apparatus of claim 9, the publishing engine further configured to publish the narrative template with the one or more empty word slots filled at a completion of the competitive gaming event.

16. At least one non-transitory machine-readable storage medium comprising instructions that when executed cause a computing system to:
receive data about a competitive gaming event, the data comprising one or more data items;
select a beat writer from a plurality of beat writers stored in a data store, wherein each of the plurality of beat writers represents a respective one of a plurality of different computerized authors, each configured for respectively different writing styles;
select a story type from a plurality of story types based on the selected beat writer;
select a story flavor from the one or more story flavors associated with the story type;
select a narrative template for the competitive gaming event according to the data and the selected story type, the narrative template comprising at least one paragraph from the set of paragraph types associated with the selected story flavor, the at least one paragraph having one or more sentences, and one or more empty word slots within the one or more sentences, and one or more empty data slots within the one or more sentences;
fill each of the one or more empty data slots in the narrative template with a data item from the one or more data items;
fill each of the one or more empty word slots in the narrative template with a word selected from a predetermined word list configured for the one or more empty word slots based on the competitive gaming data; and
publish the narrative template with the one or more empty word slots and the one or more empty data slots filled as a narrative summary of competitive gaming narrative content.

17. The machine-readable storage medium of claim 16, wherein the data is obtained from at least one of:
a competitive gaming league;
a competitive gaming event organizer;
a competitive gaming content producer; and
a video game developer.

18. The machine-readable storage medium of claim 16, wherein the narrative template is published at a completion of the competitive gaming event.

19. The machine-readable storage medium of claim 16, wherein the data comprises at least one of:
a competition name;
a league name;
a competitor name;
a team name;
a date of the event;
a time of the event;
a competition result;
a prize money value;

a score;
a video game level;
a video game title; and
a video game character.

* * * * *